United States Patent [19]
Mead et al.

[11] 3,937,635
[45] Feb. 10, 1976

[54] LITHIUM-IODINE BATTERY

[75] Inventors: Ralph T. Mead, Kenmore; Wilson Greatbatch, Clarence, both of N.Y.

[73] Assignee: Wilson Greatbatch, Clarence, N.Y.

[22] Filed: Jan. 9, 1975

[21] Appl. No.: 539,731

[52] U.S. Cl. .............................. 136/83 R; 136/6 LN
[51] Int. Cl.² ........................................... H01M 4/36
[58] Field of Search ......... 136/83 R, 6 LN, 20, 137, 136/6 A

[56] References Cited
UNITED STATES PATENTS

| | | | |
|---|---|---|---|
| 3,653,966 | 4/1972 | Hill | 136/83 R |
| 3,660,163 | 5/1972 | Moser | 136/83 R |
| 3,660,164 | 5/1972 | Hermann et al. | 136/83 R |
| 3,674,562 | 4/1972 | Schneider et al. | 136/83 R |
| 3,723,183 | 3/1973 | Greatbach | 136/83 R |
| 3,773,559 | 11/1973 | Mead | 136/83 R X |
| 3,817,791 | 6/1974 | Greatbach et al. | 136/83 R |
| 3,874,929 | 4/1975 | Greatbach | 136/83 R |

*Primary Examiner*—G. L. Kaplan
*Assistant Examiner*—C. F. Lefevour
*Attorney, Agent, or Firm*—Christel & Bean

[57] ABSTRACT

A lithium-iodine cell including a lithium anode, a lithium iodine electrolyte and a cathode comprising a source of iodine in the form of a substantially solid block or pellet of iodine and iodine-containing depolarizer material applied in the form of a relatively thin layer or coating to a lithium surface of the anode and to a surface of the iodine block. The depolarizer material serves to transport iodine ions from the source to the electrolyte, and the material is a charge transfer complex of an organic donor component and iodine such as 2-vinyl pyridine iodide.

13 Claims, 4 Drawing Figures

U.S. Patent   Feb. 10, 1976   3,937,635
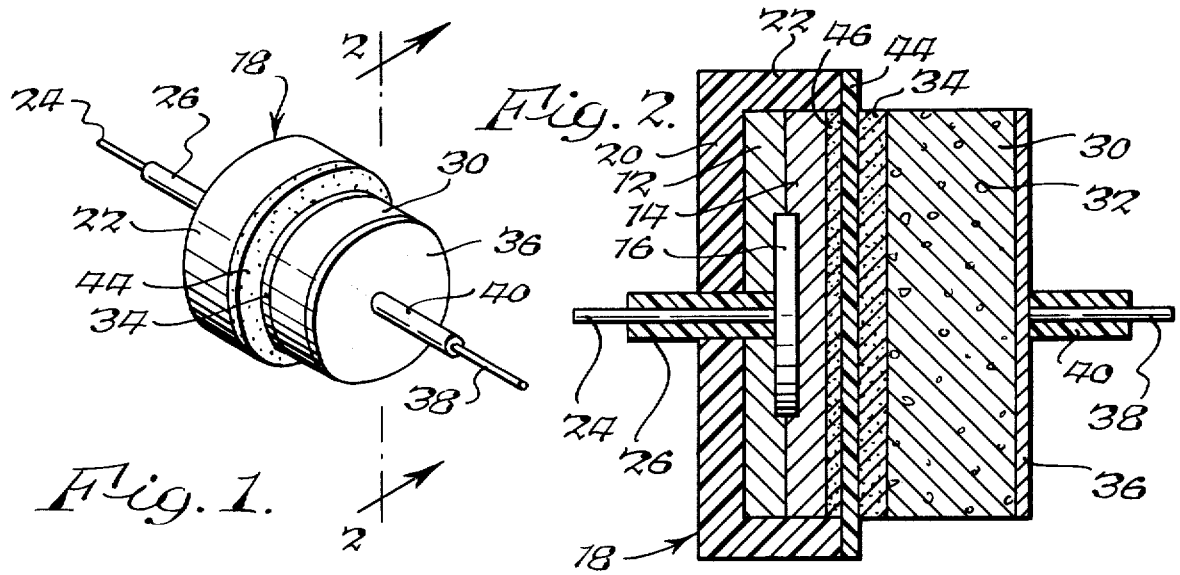
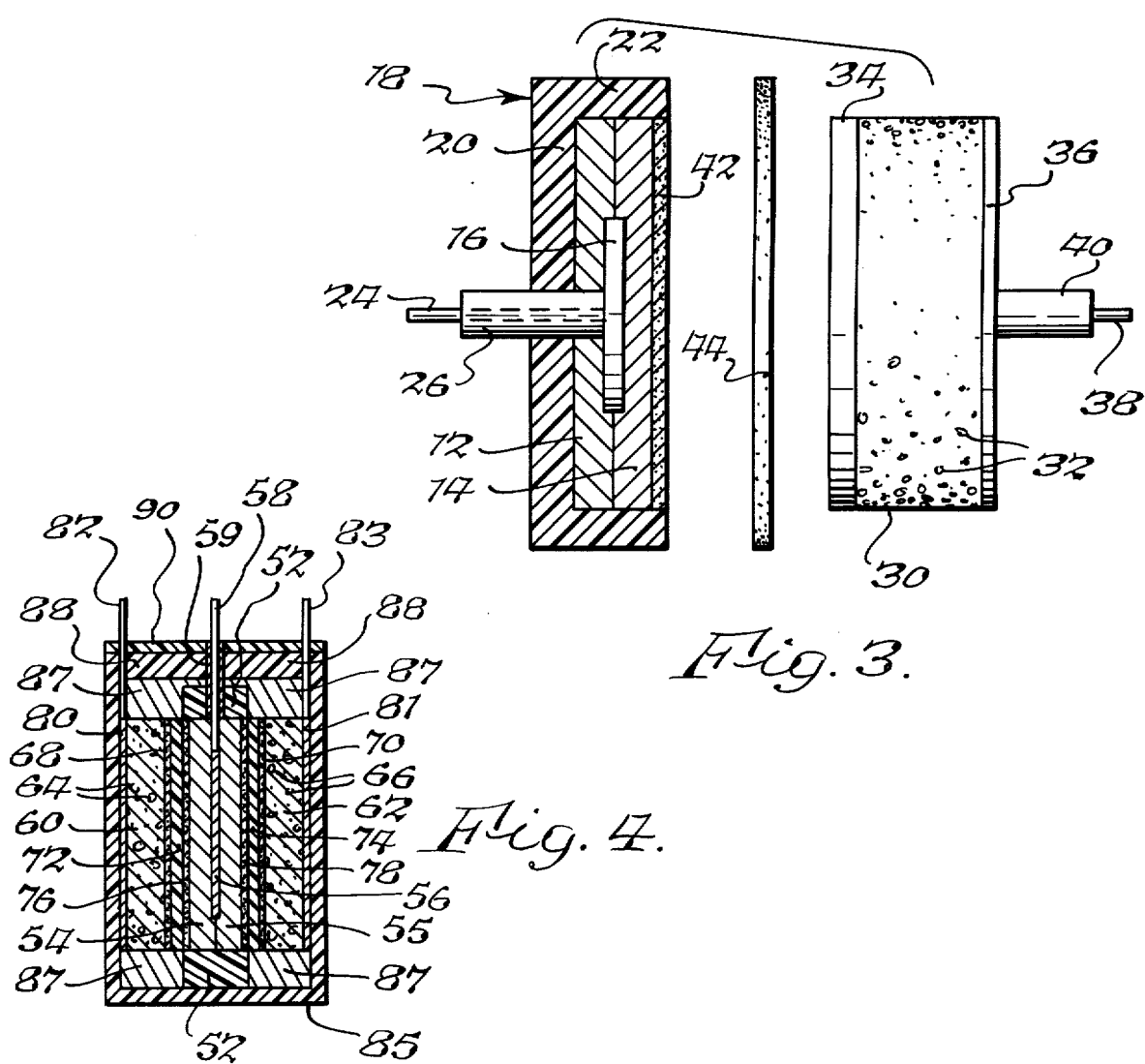

LITHIUM-IODINE BATTERY

BACKGROUND OF THE INVENTION

This invention relates to the conversion of chemical energy to electrical energy, and more particularly to a new and improved construction for lithium-iodine cells and method of making the same.

One area of use of the present invention is in providing electrical power safely to inaccessible devices in the human environment, for example to an implanted cardiac pacemaker, although the principles of the present invention can be variously applied. Several types of batteries for implantable cardiac pacemakers have been proposed, but heretofore all have certain limitations. Recently, a lithium-iodine cell has been proposed which advantageously has an open circuit voltage about twice that of the mercury cell, does not generate gas during operation, and has a non-corrosive electrolyte.

Several problems can arise in the manufacture or assembly of lithium-iodine cells. A cell has been proposed including a lithium anode and a cathode comprising a charge transfer complex of an organic component and iodine. Some charge transfer complexes while being highly desirable for cell operation are difficult and costly to produce. Other problems arise when the anode and cathodes are assembled, for example any air gaps remaining therebetween can, through lithium nitride formation, form an internal electrical short circuit in the cell, and if the cathode material does not completely contact the anode an abnormally high impedance can build up at the small remaining interface.

SUMMARY OF THE INVENTION

It is, therefore, an object of this invention to provide a new and improved construction for a lithium-iodine cell and a method of making the same.

It is a more particular object of this invention to provide such a cell construction and method of making the same wherein only a portion of the cathode is a charge transfer complex of an organic donor component and iodine and the remainder of the cathode comprises partly pure solid iodine.

It is a further object of this invention to provide such a cell construction and method of making the same resulting in complete contact between the lithium anode and the cathode material.

It is a further object of this invention to provide such a cell which can be manufactured relatively easily and economically.

The present invention provides a lithium-iodine cell including a lithium anode, a lithium iodine electrolyte and a cathode comprising a source of iodine and a transport medium comprising iodine-containing depolarizer material connecting the iodine source to the electrolyte for transporting iodine ions from the source to the electrolyte. The depolarizer material comprises a charge transfer complex of an organic donor component and iodine in the form of 2-vinyl pyridine iodide. The cathode is formed by providing substantially solid iodine having an electrical conductivity additive and coating a surface of the iodine element with a relatively thin layer of the depolarizer material. The cell is completed by coating a lithium surface of the anode with the depolarizer material, and placing the coated surfaces of the anode and iodine element against different surfaces of a barrier material which is penetrable by the depolarizer material and non-reactive with iodine.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of a cell according to the present invention;

FIG. 2 is a sectional view taken about on line 2—2 in FIG. 1;

FIG. 3 is a developed view illustrating the construction of the cell of FIG. 1; and FIG. 4 is a cross-sectional view of a cell according to another embodiment of the present invention.

DETAILED DESCRIPTION OF THE ILLUSTRATED EMBODIMENTS

Referring now to FIGs. 1-3, a lithium-iodine cell according to the present invention includes anode means comprising a pair of lithium members 12, 14 having an anode current collector element 16 sandwiched or positioned therebetween. The arrangement of lithium members 12, 14 and collector 16 is fitted within an anode frame or holding means 18 which, in turn, can be fixed within a suitable cell casing or housing (not shown). In particular, holding means 18 is of synthetic plastic or similar electrical insulating material and formed to have a substantially planar face portion 20 and a continuous peripheral rim portion 22 extending from face portion 20. Lithium members 12, 14 can comprise a pair of disc-shaped or rectangular-shaped plates or foil members which are fitted face-to-face within rim portion 22 of holder 18, the inner surface of rim 22 having a shape which conforms to the shape of the peripheral surfaces of members 12, 14. Anode current collector member 16 is positioned or sandwiched between plates 12, 14 in contact therewith, and can comprise a relatively thin sheet of expanded zirconium or nickel mesh. Face portion 20 of holder 18 and lithium plate 12 adjacent portion 20 are provided with small aligned slots or apertures for receiving an anode current collector lead 24 provided with a sheath or covering of electrical insulation 26 which lead 24 is connected at one end such as by welding to current collector 16 whereby an external electrical connection to the anode of the cell can be made. Anode frame or holding means 18 preferably is of a material which does not exhibit electronic conduction when exposed to iodine, for example the fluropolymers sold under the trademark Halar of the Allied Chemical Company or Tefzel of the Dupont Company.

The anode assembly can be fabricated in the following manner. The material of anode frame or holder 18, such as the fluropolymers previously identified, in addition to being of electrically insuating material, preferably also will have the characteristic of being pressure bondable to lithium. Lithium plate 12 is placed in holder 18 so as to be fitted within rim 22 wherein the aperture in plate 12 is in registry with the aperture in face portion 20. The insulated lead 24 initially is welded or connected to current collector 16, and then lead 24 is inserted through the aligned apertures in face 20 and plate 12 until current collector 16 is in contact with the exposed face of plate 12. Then plate 14 is placed in contact with current collector 16 and fitted within rim portion 22. The anode assembly then is pressed together with a suitable force, for example about 3,000 pounds, causing the assembly to be bonded together. As a result, lithium plates 12, 14 are bonded together in a manner sealing current collector 16 between the plates 12, 14 and the peripheral juncture at the edges of plates 12, 14 is sealed by rim 22 of holding means 18. If desired, the junction between the inner surface of rim portion 22 and the periphery of plates 12, 14 can be sealed further by a suitable sealant or cement.

In accordance with the present invention, the cathode comprises a source of iodine in the form of a substantially solid block or pellet 30 of substantially pure iodine provided with an additive 32 of relatively high electrical conductivity in the form of graphite particles, metal fibers or the equivalent. The cathode according to the present invention further comprises a transport medium comprising iodine-containing depolarizer material in the form of a charge transfer complex of an organic donor component and iodine connecting the iodine source to the electrolyte formed in the completed cell for transporting iodine ions from the source to the electrolyte. In preferred form the transport medium comprises a layer or coating 34 of polyvinyl pyridine iodine material on a surface of iodine block 30. The cathode is completed by a cathode current collector 36 in the form of a relatively thin plate of metal such as zirconium or nickel fixed or otherwise secured in contact with a surface of block 30, in the present instance the surface opposite that to which layer 34 is applied, and a cathode current collector lead 38 provided with suitable electrical insulation 40 is connected at one end to current collector 36. Lead 38 enables an external electrical connection to be made to the cathode of the cell.

Before the anode and cathode components of the cell are assembled together, the arrangement prior to assembly being illustrated in FIG. 3, a layer or coating 42 of material identical to that of layer 34, in particular a charge transfer complex of an organic donor component and iodine such as polyvinyl pyridine iodide, is applied to the exposed surface of lithium element 14 of the anode as shown in FIG. 3. A screen or barrier element 44 is placed between layers 34 and 42 in contact therewith when the anode and cathode elements are positioned together. In other words, the anode and iodine element 30 are placed against different surfaces of barrier element or screen 44 in a manner so that the surfaces of the anode and iodine element coated with the iodine-containing depolarizer material are in operative contact with the different surfaces of element 44. Screen 44 is of a material penetrable by the material of layers 34 and 42 and non-reactive with iodine, and it prevents the occurrence of an internal electrical short circuit between iodine block 30 containing the additive 32 of electrically conductive material and the lithium element in the anode of the cell such as lithium member 14 in a manner which will be described in further detail presently.

The lithium-iodine cell according to the present invention operates in the following manner. When the anode and cathode elements are assembled together as shown in FIGS. 1 and 2, the iodine-containing cathode material or depolarizer from layer 34 as well as from the layer 42 comes in contact with the exposed portion of lithium member 14. A lithium iodine electrolyte 46 begins to form at the interface and an electrical potential difference exists between the anode and cathode electrical leads 24 and 38, respectively. The pellet or block 30 serves as a source of iodine ions to sustain or continue the reaction, and the layer or coating 34 of polyvinyl pyridine iodide serves as a vehicle to transport iodine ions from the reservoir 30 to the interface of lithium iodine electrolyte 46 and lithium anode element 14.

The relatively thin coating or layer 34 of depolarizer material on the iodine block 30 thus acts as an intermediary or a transport medium to diffuse iodine from the solid iodine reservoir or source 30 rather than having the cathode consist entirely of a charge transfer complex of an organic donor component and iodine, such as polyvinyl pyridine iodine. The polyvinyl pyridine iodine material of layer 34 and of layer 42 serves as a glue-like material to completely wet both the exposed surface of lithium element 14 and the surface of iodine block 30. As fast as iodine is consumed from the polyvinyl pyridine iodine material more diffuses in from the iodine block or source 30. The cell according to the present invention is relatively economical to manufacture as compared to a lithium iodine cell wherein the cathode material consists entirely of a charge transfer complex of an organic donor component and iodine such as polyvinyl pyridine iodine. This is because only a part or portion of the cathode consists of the polyvinyl pyridine iodine material and the remainder of the cathode comprises partly pure and substantially solid iodine. The provision of relatively thin layers or coatings of depolarizer material, i.e. the charge transfer complex of an organic donor component and iodine in the form of polyvinyl pyridine iodine, contacting lithium element 14 in the anode of the cell and contacting the iodine block or reservoir 30, insures complete contact between the cathode and the lithium anode and minimizes assembly problems encountered with handling the material such as polyvinyl pyridine iodide. With complete contact between cathode and lithium anode being provided, there are no problems of air gaps or abnormally high impedance at the anode-cathode interface.

The material of the coating or layer 34 and of coating or layer 42 is a charge transfer complex of an organic donor component and iodine. A preferred organic material is two-vinyl pyridine polymer. The material is prepared by heating the organic material, i.e. two-vinyl pyridine polymer, to a temperature greater than the crystallization temperature of iodine and then adding iodine to the heated mixture. The amount of iodine added should be greater than about 50 percent by weight of the resulting mixture so that enough iodine is available in the material to provide sufficient conductivity for proper cell operation. The amount of iodine added, however, should not be so excessive as to interfere with surface contact between layer 34 and block 30 and between layer 42 and lithium plate 14 by recrystallization. The material is applied with a brush or other suitable applicator to form a relatively thin coating or layer, in effect painting the material onto the surface, and the exact thickness of either layer 34 or 42 is not critical. Alternatively, the layers may comprise fiberglass material coated with polyvinyl pyridine whereby formation of the iodide complex arises from a reaction with or a diffusion of iodine from the source or pellet 30 into the polyvinyl pyridine coating. As the cell operation causes the lithium iodide electrolyte 46 to form, the initially applied polyvinyl pyridine iodide layer 42 is displaced as the lithium iodide electrolyte layer 46 grows in thickness, the electrolyte 46 being shown in FIG. 2 at a thickness which has completely displaced the initial polyvinyl pyridine iodide layer.

In the cell of the present invention the iodine availability is enhanced by providing an iodine block of pellet 30 containing a high percentage of iodine. Since iodine in the pure state is a non-conductor of electricity, an additive 32 of high electrical conductivity such as graphite, metal fibers or the equivalent is incorporated in the block 30. The high conductivity additive could create an internal electrical short circuit if it were to contact the lithium metal of the cell anode. In effect, the charge transfer complex of the organic donor component and iodine separating the anode of the cell from the iodine pellet 30 acts as an electrolyte prior to the formation of the lithium iodide electrolyte in response to cell operation.

Screen or barrier 44 serves as a separator to prevent contact between the cell anode and the iodine pellet 30 provided with the high conductivity additive 32. In other words, barrier 44 is provided to prevent the graphite 32 in pellets 30 from contacting lithium element 14. Screen 44 must be of a material which is resistant to iodine in the sense of not becoming an electronic conductor in any appreciable degree when exposed to iodine. Furthermore, the material of screen 44 must be sufficiently porous to permit penetration of the screen by a flowable conducting material such as the iodine polyvinyl pyridine complex without permitting physical contact between the lithium element of the cell anode and iodine block 30. In this regard, screen 44 has characteristics similar to a membrane. By way of example, suitable materials for screen or barrier 44 are fiberglass cloth or fibrous or porous forms of fluoropolymer materials known as Teflon, Tefzel, Halar or polyester material. Teflon and Tefzel are trademarks of the Dupont Co. and Halar is a trademark of the Allied Chemical Co. Screen 44 is necessary only early in the life of the cell, because as soon as a layer of the lithium iodide electrolyte 46 forms, iodine block 30 no longer can come in contact with or touch the lithium element 14. In FIG. 1 and 3 of the drawing, stippling of screen or barrier 44 indicates its porosity or permeability.

FIG. 4 illustrates a cell according to another embodiment of the present invention constructed to include a single anode and a double cathode within the cell. The cell includes an anode frame or holding means 52 formed of suitable electrically insulating material and shaped to define an interior region for holding a lithium anode member comprising a pair of lithium plates 54, 55 pressure-bonded together and against an anode current collector element 56 in a manner similar to the arrangement of lithium plates 12, 14 and anode current collector 16 of the embodiment of FIGS. 1–3. The lithium anode elements 54, 55 can be of various shapes, for example rectangular or circular, and the shape of the interior surface of holder 52 is determined thereby. Lithium plates 54, 55 with current collector 56 sandwiched therebetween are pressure bonded within holding means 52 whereby the lithium is forced against the inner surface of frame or holder 52 thereby enhancing the seal of collector 56 between the lithium members 54, 55. An electrical lead 58 provided with suitable insulation 59 extends from collector 56 through an aperture provided in the holder 52. The anode assembly of this cell therefore provides two oppositely-directed and exposed lithium surfaces.

The cell according to this embodiment of the present invention further comprises a pair of cathodes operatively associated with corresponding ones of the exposed lithium surfaces of the single anode. In particular, there is provided first and second blocks or pellets 60 and 62, respectively, of substantially solid and pure iodine. Blocks 60 and 62 are provided with electrical conductivity additives 64 and 66, respectively, in the form of graphite particles, metal fibers or the equivalent similar to additive 32 provided in block 30 of the embodiment of FIGS. 1–3. The iodine sources 60 and 62 are provided with corresponding layers or coatings 68 and 70, respectively, of iodine-containing depolarizer material in the form of a charge transfer complex of an organic donor component and iodine such as polyvinyl pyridine iodide. Layers 68, 70 are identical to coating 34 in the embodiment of FIGS. 1–3. The two cathode structures comprising iodine blocks 60 and layer 68 and iodine block 62 and layer 70 are in operative relationship with opposite sides or surfaces of the anode and are separated therefrom by a pair of screens or barriers 72 and 74. Screens 72, 74 each serve the same function as screen 34 in the embodiment of FIGS. 1–3 and can be of the same material. Initially, a coating or layer of depolarizer material was applied to the exposed surfaces of the lithium anode elements 54, 55 but this is displaced upon assembly of the cell by lithium iodide electrolyte regions 76 and 78. Each iodine block is provided with corresponding cathode current collectors 80, 81 to which are connected cathode leads 82, 83 respectively.

The completed cell is placed in a container or housing 85 which is hollow and open at one end and formed of suitable material such as epoxy or polyester, Filler material 87 of polyvinyl pyridine iodide is introduced to fill voids between the cell and the inner surface of casing 85. A sealing layer 88 of epoxy material is introduced to a level substantially flush with the open end surface of casing 85. A lid 90 then is positioned on this end of casing 85 and sealed thereto. Lid 90 is provided with openings at appropriate locations to allow anode lead 58 and cathode leads 82, 83 to extend therefrom permitting external electrical connection to be made to the cell. In most instances another outer casing of stainless steel will be provided and hermetically sealed. The cell according to this embodiment of the present invention has one quarter of the rate of resistance buildup as compared to a cell having a single anode and single cathode. This is because twice as much area is present and buildup is half as fast. Advantageously, this is provided in a cell of relatively simple and compact construction.

The method of making the cell of FIG. 4 is summarized as follows. The anode comprising lithium elements 54, 55 sandwiched against current collector 56 and secured within frame or holder 52 is assembled, and depolarizer material in the form of polyvinyl pyridine iodide is painted or applied in a suitable manner to the two exposed lithium surfaces of the anode. Screens or separators 72, 74 then are applied to the painted or coated surfaces of the amode. One side or surface of each of the two iodine blocks 60 and 62 is painted with depolarizer material in the form of polyvinyl pyridine iodide. Then blocks 60 and 62 are placed against screens 72 and 74, respectively, with the coated surface of each block in contact with the corresponding screen.

The resulting assembly then is placed within casing 85 in a tight-fitting manner, any remaining voids are filled with polyvinyl pyridine iodide material 87, epoxy sealing material 88 is poured over the assembly within casing 85 and is cured, and lid 90 is secured to casing 85. Thus, the cell of the present invention which has numerous structural and operational advantages is made by a method having relatively few steps which are relatively easy to perform.

It is therefore apparent that the present invention accomplishes its intended objects. While various embodiments of the present invention have been described in detail, this is for purpose of illustration, not limitation.

We claim

1. In a lithium-iodine cell including a lithium anode and a lithium iodide electrolyte, a cathode comprising:
    a. an element of iodine having an additive of electrically conductive material;
    b. a layer of material comprising a charge transfer complex of an organic donor component and iodine on a surface of said iodine element, said layer being operatively adjacent said lithium anode for supplying iodine to said electrolyte; and
    c. barrier means penetrable by said charge transfer complex material and located between said layer and said lithium anode for preventing contact between said anode and said additive of electrically conductive material of said iodine element prior to formation of said electrolyte.

2. A cell according to claim 1, further including another layer of material comprising a charge transfer complex of an organic donor component and iodine between said barrier means and said lithium anode, said other layer being displaced upon formation of said electrolyte during operation of said cell.

3. A cell according to claim 1, wherein the material of said layer comprises 2-vinyl pyridine iodide.

4. A cell according to claim 2, wherein the material of said other layer comprises 2-vinyl pyridine iodide.

5. A cell according to claim 1, wherein said anode comprises a pair of lithium elements having a current collector therebetween, said lithium elements being fitted within a frame.

6. A cell according to claim 5, wherein said frame is of a material which does not exhibit electronic conduction when exposed to iodine.

7. A cell according to claim 1, wherein said anode comprises a pair of lithium elements having a current collector therebetween thereby providing two exposed lithium anode surfaces and wherein a lithium iodide electrolyte is in operative contact with each of said anode surfaces and including a pair of cathodes operatively associated with a corresponding one of said anode surfaces, each of said cathodes comprising said iodine element said charge transfer complex material and said barrier means.

8. A cell according to claim 7, wherein said lithium elements are fitted within a frame.

9. A cell according to claim 8, wherein said frame is of a material which does not exhibit electronic conduction when exposed to iodine.

10. A method of making a lithium-iodine cell comprising the steps of:
    a. providing an anode comprising a lithium element having an exposed surface portion, a current collector in operative contact with another surface portion of said lithium element and electrical conductor means connected to said current collector;
    b. providing an element of iodine including an additive of electrically conductive material and having an operative surface, a current collector in operative contact with another surface of said iodine element and electrical conductor means connected to said current collector;
    c. coating said operative surface of said iodine element with material comprising a charge transfer complex of an organic donor component and iodine; and
    d. placing said anode and said iodine element into operative relationship so that said charge transfer complex material is in operative contact with said exposed surface portion of said lithium element while preventing contact between said electrically conductive additive material of said iodine element and said lithium element;
    e. whereby a lithium iodide electrolyte forms at the interface of said lithium element and charge transfer complex material creating a potential difference between said conductors and whereby said iodine element serves as a source of iodine to sustain the reaction.

11. A method according to claim 10 wherein said step of preventing contact between said electrically conductive additive material of said iodine element and said lithium element comprises:
    a. providing a barrier element of a material which is penetrable by said charge transfer complex material; and
    b. placing said anode and said iodine element against different surfaces of said barrier element so that said charge transfer complex material and said exposed surface portion of said lithium element are in operative contact with said surface of said barrier element.

12. A method according to claim 10 further including coating said exposed surface portion of said lithium element with said charge transfer complex material prior to placing said anode and said iodine element into operative relationship.

13. A method according to claim 12, wherein said step of preventing contact between said electrically conductive additive material of said iodine element and said lithium element comprises:
    a. providing a barrier element of a material which is penetrable by said charge transfer complex material; and
    b. placing said anode and said iodine element against different surfaces of said barrier element so that the surfaces of said anode and said iodine element coated with said charge transfer complex material are in operative contact with said surfaces of said barrier element.

* * * * *